US010875256B2

(12) United States Patent
Forston et al.

(10) Patent No.: US 10,875,256 B2
(45) Date of Patent: Dec. 29, 2020

(54) METHOD OF MAKING JOINT FOR STRUCTURE

(71) Applicant: The Boeing Company, Chicago, IL (US)

(72) Inventors: Gabriel Z. Forston, Lake Stevens, WA (US); Christopher G. Harris, Auburn, WA (US); Joshua P. Tyndall, Everett, WA (US); Hyukbong Kwon, Mukilteo, WA (US); Carolyn Schmidt, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/866,943

(22) Filed: Jan. 10, 2018

(65) Prior Publication Data

US 2018/0126711 A1    May 10, 2018

Related U.S. Application Data

(62) Division of application No. 14/045,483, filed on Oct. 3, 2013, now Pat. No. 10,144,203.

(51) Int. Cl.
*B29C 65/00* (2006.01)
*B64C 1/06* (2006.01)
(Continued)

(52) U.S. Cl.
CPC .... *B29C 66/43441* (2013.01); *B29C 66/4344* (2013.01); *B29C 66/496* (2013.01);
(Continued)

(58) Field of Classification Search
CPC .......... B29C 66/43411; B29C 66/496; B29C 66/524; B29C 70/86; B29C 70/865;
(Continued)

(56) References Cited

U.S. PATENT DOCUMENTS 4,331,495 A * 5/1982 Lackman ............. B29C 70/865
156/93
4,789,594 A * 12/1988 Stawski ................. B26D 1/02
156/222

(Continued)

FOREIGN PATENT DOCUMENTS

EP        2052846     4/2009
WO    2010144007    12/2010

OTHER PUBLICATIONS

Weber, Austin, Cure Epoxies with Heat, Assembly Magazine, May 4, 2015, pp. 1-9.

(Continued)

*Primary Examiner* — John L Goff, II
(74) *Attorney, Agent, or Firm* — Kunzler Bean & Adamson

(57) ABSTRACT

A method of making a joint for a structure comprises forming a thermoplastic filler, applying an uncured first thermoset layer into direct contact with the thermoplastic filler, applying an uncured second thermoset layer into direct contact with the thermoplastic filler, and applying an uncured third thermoset layer into direct contact with the thermoplastic filler. The method additionally comprises curing the uncured first thermoset layer, the uncured second thermoset layer, and the uncured third thermoset layer at a temperature below a melting temperature of the thermoplastic material to form a cured first thermoset layer, a cured second thermoset layer, and a cured third thermoset layer and bonding together the cured first thermoset layer, the cured second thermoset layer, the cured third thermoset layer, and the thermoplastic filler.

20 Claims, 6 Drawing Sheets

(51) Int. Cl.
*B64C 1/12* (2006.01)
*B29C 70/86* (2006.01)
*B29C 70/08* (2006.01)
*B32B 7/06* (2019.01)
*B32B 27/08* (2006.01)
*B32B 27/20* (2006.01)
*B64C 1/00* (2006.01)
*B29L 31/30* (2006.01)

(52) U.S. Cl.
CPC .......... *B29C 66/524* (2013.01); *B29C 66/721* (2013.01); *B29C 66/73941* (2013.01); *B29C 70/086* (2013.01); *B29C 70/86* (2013.01); *B32B 7/06* (2013.01); *B32B 27/08* (2013.01); *B32B 27/20* (2013.01); *B64C 1/064* (2013.01); *B64C 1/12* (2013.01); *B29C 66/7212* (2013.01); *B29C 66/73115* (2013.01); *B29C 66/73117* (2013.01); *B29C 66/73756* (2013.01); *B29C 66/91411* (2013.01); *B29C 66/91935* (2013.01); *B29L 2031/3076* (2013.01); *B29L 2031/3082* (2013.01); *B29L 2031/3085* (2013.01); *B32B 2262/101* (2013.01); *B32B 2262/106* (2013.01); *B32B 2605/18* (2013.01); *B64C 2001/0072* (2013.01); *Y02T 50/40* (2013.01); *Y10T 428/24529* (2015.01); *Y10T 428/249952* (2015.04)

(58) Field of Classification Search
CPC ............ B29C 66/43441; B29C 66/636; B29C 66/4344; B29C 66/721; B29C 66/73941; B29C 66/73115; B29C 66/91935; B64C 1/06; B64C 1/064; B64C 1/065; B64C 1/12; B32B 2605/18; B29L 2031/3076; B29L 2031/3082; B29L 2031/3085; Y02T 50/40

See application file for complete search history.

(56) References Cited

U.S. PATENT DOCUMENTS

| | | | |
|---|---|---|---|
| 4,966,802 A | | 10/1990 | Hertzberg |
| 5,487,941 A | * | 1/1996 | Pepin ..................... D02G 3/385 428/364 |
| 5,800,657 A | * | 9/1998 | Hooper ................... B29C 70/70 156/244.11 |
| 5,833,786 A | | 11/1998 | McCarville et al. |
| 5,919,543 A | | 7/1999 | McCarville et al. |
| 6,562,436 B2 | | 5/2003 | George et al. |
| 6,709,538 B2 | | 3/2004 | George et al. |
| 7,205,066 B1 | * | 4/2007 | Hammi ................... B64C 1/064 429/119 |
| 7,732,033 B2 | | 6/2010 | Van Aken et al. |
| 8,540,833 B2 | | 9/2013 | Deobald et al. |
| 2007/0175575 A1 | * | 8/2007 | Rubin ................... B29C 70/504 156/221 |
| 2009/0065977 A1 | * | 3/2009 | Suzuki ................. B29C 43/203 264/339 |
| 2009/0317587 A1 | * | 12/2009 | Deobald .............. B29C 70/865 428/119 |
| 2012/0074265 A1 | | 3/2012 | Hallander et al. |
| 2013/0171895 A1 | | 7/2013 | Wolf et al. |

OTHER PUBLICATIONS

Office Action for European Patent Application No. EP14903502.4 dated Nov. 26, 2018.

* cited by examiner

METHOD OF MAKING JOINT FOR STRUCTURE

FIELD

This disclosure relates generally to complex structures made from thermoset materials, and more particularly to the formation of joints adjoining layers of thermoset materials.

BACKGROUND

Today, many complex structures, such as aircraft, spacecraft, automobiles, and the like, are made from composite materials. Composite materials typically include fibrous materials embedded in a matrix made from thermoset materials. Uncured thermoset materials are arranged in a desired manner and then cured to harden the matrix. Like complex structures made from more traditional materials, such as metal, complex structures made from composite materials include a significantly large number of interconnected components. The interconnected components of complex structures are connected together at joints. The joints of conventional complex structures are traditionally formed using fasteners and weldments. However, the joints of some complex structures formed from composite materials are formed using adhesives and co-curing of thermoset materials.

To improve the characteristics of joints between components made from composite materials, the components incorporate bends at the joints, which introduce gaps within the joints. Often, the gaps are filled with thermoset materials that cure concurrently with the thermoset materials forming the components. Because uncured thermoset materials are flexible and pliable, before and during curing, maintaining such materials in place can be difficult. Additionally, after curing, thermoset joint fillers are susceptible to cracking due to thermal and mechanical static and fatigue loads.

SUMMARY

The subject matter of the present application has been developed in response to the present state of the art, and in particular, in response to the problem of, and the need to mitigate, crack formation in components of various systems, such as aircraft, that have not yet been fully solved by currently available techniques. Accordingly, the subject matter of the present application has been developed to provide an apparatus, system, and method for mitigating the formation of cracks in multi-component systems, such as an aircraft, that overcome at least some of the above-discussed shortcomings of prior art techniques.

According to one embodiment, an apparatus includes a first thermoset layer that includes a first fibrous material embedded in a first thermoset matrix. The apparatus also includes a second thermoset layer that includes a second fibrous material embedded in a second thermoset matrix. The second thermoset layer is coupled to the first thermoset layer to form a joint. Further, a gap is defined between the first thermoset layer and the second thermoset layer. The apparatus also includes a thermoplastic filler that is made from a thermoplastic material. The thermoplastic filler is positioned within the gap.

In some implementations, the apparatus also includes a third thermoset layer that includes a third fibrous material embedded in a third thermoset matrix. The third thermoset layer is coupled to the first and second thermoset layers to form the joint. The gap is defined between the first, second, and third thermoset layers. The gap can have a generally triangular-shaped cross-section and the thermoplastic filler can have a generally triangular-shaped cross-section corresponding with the generally triangular-shaped cross-section of the gap. A cross-sectional shape of the gap and the thermoplastic filler can be substantially non-symmetrical.

According to some implementations, the first and second fibrous material includes carbon fibers. The first and second thermoset matrices may each include a cured cross-linked material. The thermoplastic material may be a non-curable and non-cross-linkable material. Further, a cure temperature of each of the first and second matrices can be less than a melting point of the thermoplastic material.

In certain implementations, the first thermoset layer includes a first bent portion that has a first radius of curvature. The first bent portion defines the gap. The thermoplastic filler includes a first curved surface that has a second radius of curvature that corresponds with the first radius of curvature. The second thermoset layer can include a second bent portion that has a third radius of curvature. The second bent portion can define the gap, and the thermoplastic filler can include a second curved surface that has a fourth radius of curvature that corresponds with the third radius of curvature. The first, second, third, and fourth radii of curvature can be the same. The first and second radii of curvature can be the same, and the third and fourth radii of curvature can be the same, where the first and second radii of curvature are different than the third and fourth radii of curvature. The apparatus may also include a third thermoset layer that includes a third fibrous material embedded in a third thermoset matrix. The third thermoset layer can include a planar portion that defines the gap, and the thermoplastic filler can include a flat surface that corresponds with the planar portion of the third thermoset layer.

According to yet another embodiment, a method for making a joint for a structure includes forming a thermoplastic filler made from a thermoplastic material. The method also includes applying an uncured first thermoset layer onto the thermoplastic filler, where the uncured first thermoset layer includes a first fibrous material embedded in a first thermoset matrix. Additionally, the method includes applying an uncured second thermoset layer onto the thermoplastic filler and into contact with the uncured first thermoset layer, where the uncured second thermoset layer includes a second fibrous material embedded in a second thermoset matrix. While the uncured first and second thermoset layers are applied onto the thermoplastic filler and while the uncured second thermoset layer contacts the uncured first thermoset layer, the method includes curing the uncured first and second thermoset layers and bonding together the first thermoset layer, second thermoset layer, and thermoplastic filler.

In some implementations of the method, the uncured first and second thermoset layers are cured at a temperature below a melting temperature of the thermoplastic material. The method can further include applying an uncured third thermoset layer onto the thermoplastic filler, where the uncured third thermoset layer includes a third fibrous material embedded in a third thermoset matrix. Forming the thermoplastic filler can include compression molding the thermoplastic material. Alternatively, forming the thermoplastic filler can include extruding the thermoplastic material.

In certain implementations of the method, forming the thermoplastic filler includes forming at least one concave surface in the thermoplastic filler. Applying the uncured first thermoset layer onto the thermoplastic filler can include bending the uncured first thermoset layer along the at least one concave surface, and curing the uncured first thermoset layer can include curing the uncured first thermoset layer while bent along the at least one concave surface.

According to another embodiment, an aircraft includes a first layer made from a thermoset carbon-fiber composite material and a second layer made from a thermoset carbon-fiber composite material. The second layer is coupled to the first layer to form a joint and to define a gap between the first and second layers. The aircraft also includes a hardened filler made from a thermoplastic material positioned within the gap.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
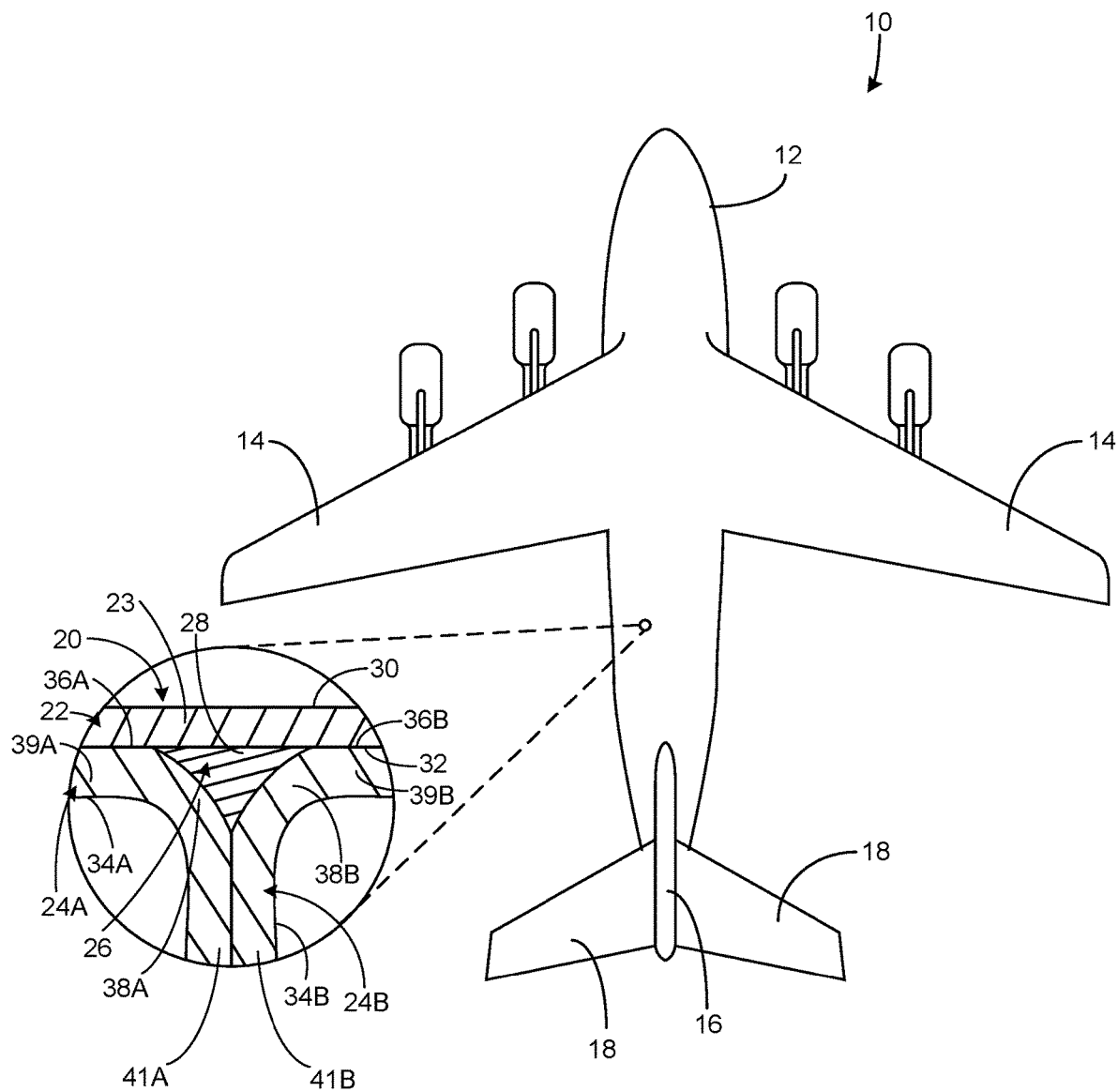
FIG. 1 is a top plan view of an aircraft showing a detailed cross-sectional view of a joint of the aircraft according to one embodiment.

Referring to FIG. 1, one embodiment of an aircraft 10 is shown. The aircraft 10 can be any of various aircraft, such as commercial aircraft used for the transportation of passengers, military aircraft for military operations, personal aircraft, and the like. Moreover, although an aircraft is depicted in the illustrated embodiments, in other embodiments, another complex structure, such as a vehicle (e.g., helicopter, boat, spacecraft, automobile, etc.) or non-mobile complex structure (e.g., building, bridge, machinery, etc.) can be used. As defined herein, a complex structure includes any multi-component structures in a fully operative state to fulfill the intended purpose of the structure.

The depicted aircraft 10 includes a body 12 (e.g., fuselage), a pair of wings 14 coupled to and extending from the body 12, a vertical stabilizer 16 coupled to the body, and a pair of horizontal stabilizers 18 coupled to the body and/or the vertical stabilizer. The aircraft 10 can be any of various types of aircraft, such as a passenger airplane, a fighter jet, a helicopter, spacecraft, and the like. As depicted, the aircraft 10 represents a passenger airplane.

Generally, the body 12, wings 14, vertical stabilizer 16, and horizontal stabilizers 18 of the aircraft each includes an internal frame enveloped by a cover or skin. The cover is coupled to the frame to form an exterior shell of the aircraft. Most commonly, the cover is coupled to the frame using a plurality of fasteners that extend through the cover and engage the frame. For sealing, insulation, electrical conduction, and/or aesthetic effects, one or more additional components can be coupled to an exterior of the cover. For example, one or more coatings can be applied onto the cover. The coatings can include one or more of a sealant coating made from any of various materials, such as an insulation material, dielectric material, a paint coating, a conductive material coating, or a coating embedded with structural components, such as a conductive mesh or layer.

One or both of the cover and internal frame can be made from one or more layers of a composite fiber material or fiber-reinforced polymer. The composite fiber material includes a curable thermoset matrix, such as a polymer-based matrix, with reinforced fibers, such as carbon-based fibers, glass-based fibers, and the like. The layers of composite fiber material may be coupled together to form a joint. Generally, a joint in the cover or frame of the aircraft 10 is formed by adjoining at least two layers of uncured composite fiber material, and co-curing the two layers by applying heat to the layers. The heat applied to the layers has a temperature above a curing temperature of the thermoset matrix to harden the matrix. Curing the thermoset matrix of the composite fiber material induces irreversible chemical reactions that create permanent connections (e.g., cross-links) between the molecular chains of the matrix. The formation of permanent cross-links adds a three-dimensional structure to the composite fiber material, as well as increases the rigidity of the material. After curing, the thermoset matrix of the composite fiber cannot return to the uncured state by re-melting the matrix in the same manner as a thermoplastic material. In other words, curing the thermoset matrix permanently changes the chemical structure of the thermoset matrix.

According to one embodiment, as shown in the detailed view of FIG. 1, the cover and/or internal frame of the aircraft 10 can include a joint 20 formed at the intercoupling of multiple thermoset layers 22, 24A, 24B (e.g., sheets). Each thermoset layer 22, 24A, 24B is made from reinforced fibers or fibrous material embedded in a thermoset matrix. In certain implementations, while the thermoset layers 22, 24A, 24B are in an uncured "pre-impregnated" state, they are arranged in contact with each other and against a thermoplastic filler 26 to form the joint 20. With the uncured thermoset layers 22, 24A, 24B arranged to form the joint 20 about the thermoplastic filler 26, the thermoset layers are cured in place by the application of heat at or above a cure temperature associated with the thermoset matrix. Curing the thermoset layers 22, 24A, 24B while in contact with each other results in the thermoset matrices of adjacent layers bonding with each other to fixedly couple the layers together.

The thermoset layers 22, 24A, 24B of the joint 20 may have any of various thicknesses, compositions, and configurations. For example, each thermoset layer 22, 24A, 24B can include multiple sub-layers of composite fiber material with the fibers of each layer being oriented in the same or a different manner. Further, the thermoset layers 22, 24A, 24B may form any of various structural features of the aircraft 10. For example, in one implementation, the thermoset layer 22 may act as an outer layer (e.g., cover) of the aircraft 10, and the thermoset layers 24A, 24B may act as inner layers (e.g., frame) of the aircraft. In other implementations, all the thermoset layers 22, 24A, 24B act as outer layers of the aircraft, or all of the thermoset layers act as inner layers of the aircraft.

In the illustrated embodiment, the thermoset layer 22 includes a substantially flat portion 23 proximate the joint 20. In contrast, the thermoset layers 24A, 24B each includes a bent portion 38A, 38B, respectively, and respective flat portions 39A, 39B, 41A, 41B extending from the respective bent portions proximate the joint 20. More specifically, the joint 20 is formed by fixedly coupling together the inner surfaces 36A, 36B of corresponding planer portions 41A, 41B of the thermoset layers 24A, 24B, fixedly coupling together the inner surface 36A of the flat portion 39A of the thermoset layer 24A and an inner surface 32 of a section of the flat portion 23 of the thermoset layer 22, and fixedly coupling together the inner surface 36B of the flat portion 39B of the thermoset layer 24B and the inner surface 32 of another section of the flat portion 23 of the thermoset layer 22. The inner surfaces 32, 36A, 36B of the thermoset layers 22, 24A, 24B oppose corresponding outer surfaces 30, 34A, 34B of the thermoset layers.

When the joint 20 is formed, a gap 28 or space is defined between the inner surfaces 36A, 36B of the bent portions 38A, 38B of the thermoset layers 24A, 24B, and the inner surface 32 of the flat portion 23 of the thermoset layer 22. Accordingly, the gap 28 has a cross-sectional shape defined by the inner surfaces 32, 36A, 36B of the thermoset layers 22, 24A, 24B. In the illustrated embodiment of FIG. 1, the gap 28 has a generally triangular cross-sectional shape. The inner surfaces 36A, 36B of the bent portions 38A, 38B are curved to have any of various radii of curvature. Accordingly, the two curved sides of the gap 28 may have any of various radii of curvature corresponding with the radii of curvature of the inner surfaces 36A, 36B of the bent portions 38A, 38B. In some implementations, such as shown in FIG. 1, the bent portions 38A, 38B can be bent to the same degree such that the radii of curvature of the inner surfaces 36A, 36B, and the two curved sides of the gap 28, are the same. In contrast, in other implementations, such as shown in the joint 120 of FIG. 3, the bent portions 138A, 138B can be bent at different degrees such that the radii of curvature of the curved surfaces 140A, 140B, and the two curved sides of the gap 128, are different. For example, the bent portion 138B of the thermoset layer 124B is bent at a sharper angle than the bent portion 138A of the thermoset layer 124A such that the radius of curvature of the curved surface 140B of the bent portion 138B, and associated curved side of the gap 128, is less than the radius of curvature of the curved surface 140A of the bent portion 138A, and the associated curved side of the gap.

The thermoplastic filler 26 of the joint 20 is located or positioned within the gap 128. In certain implementations, the thermoplastic filler 26 is closely fitted within the gap 128 and provides support to the thermoset layers 22, 24A, 24B, which increases the overall strength of the joint 20 and improves the stiffness of the joint. Further, the thermoplastic filler 26 mitigates the formation of micro-cracks and macro-cracks in the thermoset layers 22, 24A, 24B.

The thermoplastic filler 26 is made from a thermoplastic material. In contrast to the thermoset material of the thermoset layers, thermoplastic material of the filler 26 softens upon the application of heat, and hardens upon the removal of heat. Additionally, different than thermoset materials, the transformation of thermoplastic materials between a hardened state and a pliable state involves only a physical transformation, as opposed to the chemical transformation (e.g., cross-linking) of a cured thermoset material. Therefore, the transformation of the thermoplastic materials between hardened and pliable states is reversible. In some implementations, the thermoplastic material of the filler 26 is embedded with fibrous materials.

Generally, a thermoplastic material in a hardened state becomes pliable (e.g., unstable) at a melting temperature of the thermoplastic material. In some embodiments, the melting temperature of the thermoplastic material of the filler 26 is higher than the curing temperature of the thermoset material of the thermoset layers 22, 24A, 24B. According to some implementations, the melting temperature of the thermoplastic material of the filler 26 is greater than between about 450° F. and 750° F., and the curing temperature of the thermoset material of the thermoset layers 22, 24A, 24B is between about 300° F. and about 400° F. In one implementation, the melting temperature of the thermoplastic material is about 710° F. and the curing temperature of the thermoset material is about 355° F. According to some implementations, a ratio of the melting temperature of the thermoplastic material to the curing temperature of the thermoset material is between about 1.125 and about 2.5. In one specific implementation, the ratio of the melting temperature of the thermoplastic material to the curing temperature of the thermoset material is about 2.

Figure 2:
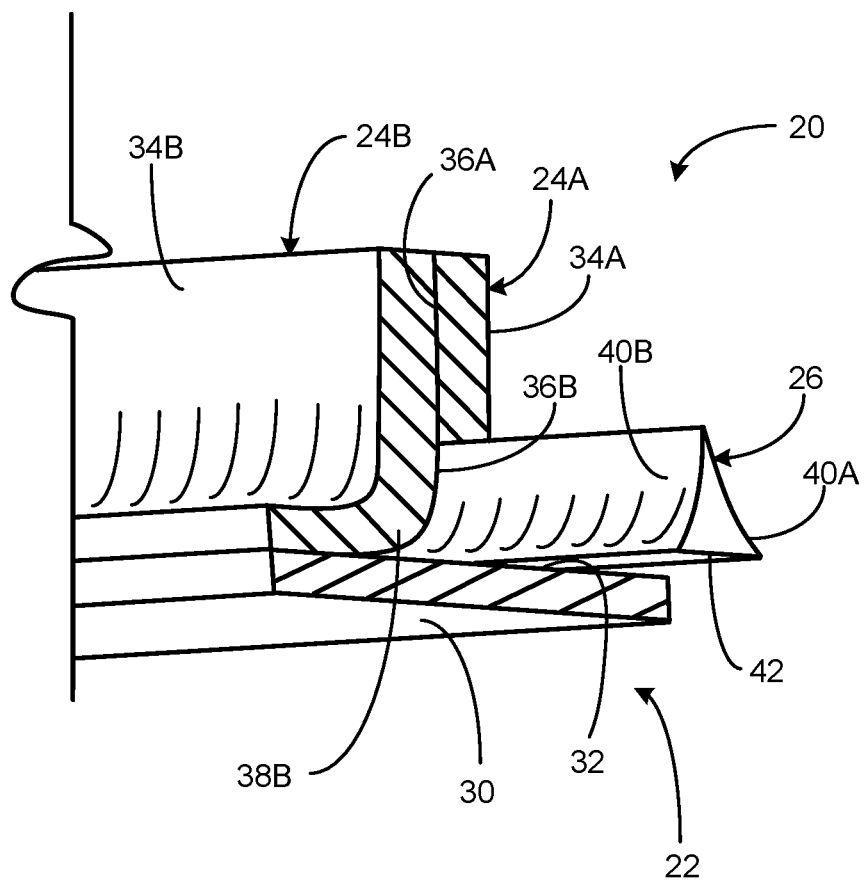
FIG. 2 is a cross-sectional perspective view of a joint of an aircraft according to one embodiment.

Referring to FIGS. 1 and 2, the thermoplastic filler 26 has a cross-sectional shape and size corresponding with the cross-sectional shape and size of the gap 28. Accordingly, in the illustrated embodiment of FIG. 1, the thermoplastic filler 26 has a generally triangular cross-sectional shape with one flat side 42 and two curved sides 40A, 40B (with corresponding curved surfaces). The flat side 42 corresponds with the inner surface 32 of the flat portion 23 of the thermoset layer 22. The surfaces of the two curved sides 40A, 40B each have a radius of curvature that corresponds with the radius of curvature of the respective inner surfaces 36A, 36B of the thermoset layers 24A, 24B. In certain embodiments, the radii of curvature of the two curved sides 40A, 40B of the filler 26 are substantially the same as, or just smaller than, the radii of curvature of the respective inner surfaces 36A, 36B of the thermoset layers 24A, 24B. In this manner, the thermoplastic filler 26 is configured to nestably engage the inner surfaces 32, 36A, 36B of the thermoset layers 22, 24A, 24B. In some implementations, the thermoplastic filler 26 is configured to create an interference fit between the inner surfaces 32, 36A, 36B of the thermoset layers 22, 24A, 24B and the sides 42, 40A, 40B of the filler.

As shown in FIG. 2, the joint 20 and thermoplastic filler 26 extend lengthwise along the thermoset layers 22, 24A, 24B. Accordingly, the joint 20 and thermoplastic filler 26 each has a length that extends transversely relative to the cross-section of the joint 20 and filler as shown in FIG. 1. In some embodiments, the length of the filler 26 is approximately equal to the length of the joint 20. However, in other embodiments, the filler 26 may have a length that is less or more than the length of the joint 20. In FIG. 2, a length of the thermoset layers 22, 24A, 24B is truncated to show the cross-sectional shapes of the thermoset layers, as well as to show a perspective view of the thermoplastic filler 26.

The thermoplastic filler 26 is pre-formed before assembly of the joint 20 based on the desired size and shape of the gap 28. In other words, prior to the thermoset layers 22, 24A, 24B being brought together and cured about the thermoplastic filler 26, a desired size and shape of a joint gap is determined, and the filler is made according to the desired size and shape of the joint gap. Accordingly, the filler 26 is made in a manufacturing process separate from the assembly and curing processes of the thermoset layers 22, 24A, 24B. The thermoplastic filler 26 can be made by using any of various manufacturing processes known in the art to be conducive to the manufacture of thermoplastic materials. For example, in one embodiment, the thermoplastic filler 26 can be made using a continuous compression molding technique, which includes compressing a thermoplastic material (often in pellet or varying directional layers of unidirectional composite material (e.g., pre-impregnated composite fibers)) into a heated compression mold channel with a cross-section sized and shaped according to the desired cross-sectional size and shape of the filler. In other embodiments, the thermoplastic filler 26 is made using a continuous extrusion technique, which includes pushing or pulling melted thermoplastic material through a heated die that shapes the material into the desired filler size and shape. According to some embodiments, the thermoplastic filler 26 can be made using machining techniques by machining a hardened piece of thermoplastic material. For example, the joint 20 may be configured to define a gap 28 with a non-uniform cross-sectional size and/or shape along a length of the joint. Machining techniques can be used to make a thermoplastic filler 26 that matches the non-uniform cross-sectional size and/or shape of the gap 28 that may be less practical to achieve using continuous compressing molding or extrusion techniques.

A pre-formed thermoplastic filler 26 can be used as a guide to properly position, support, and orient the uncured thermoset layers forming the joint 20. Uncured pre-impregnated thermoset layers or sheets are pliable and flexible, while the pre-formed thermoplastic filler 26 is hard and stiff. Accordingly, the uncured thermoset layers 22, 24A, 24B forming the joint can be applied onto or about the thermoplastic filler 26, which can support and maintain the shape of the uncured thermoset layers prior to and during the curing process of the layers.

Figure 3:
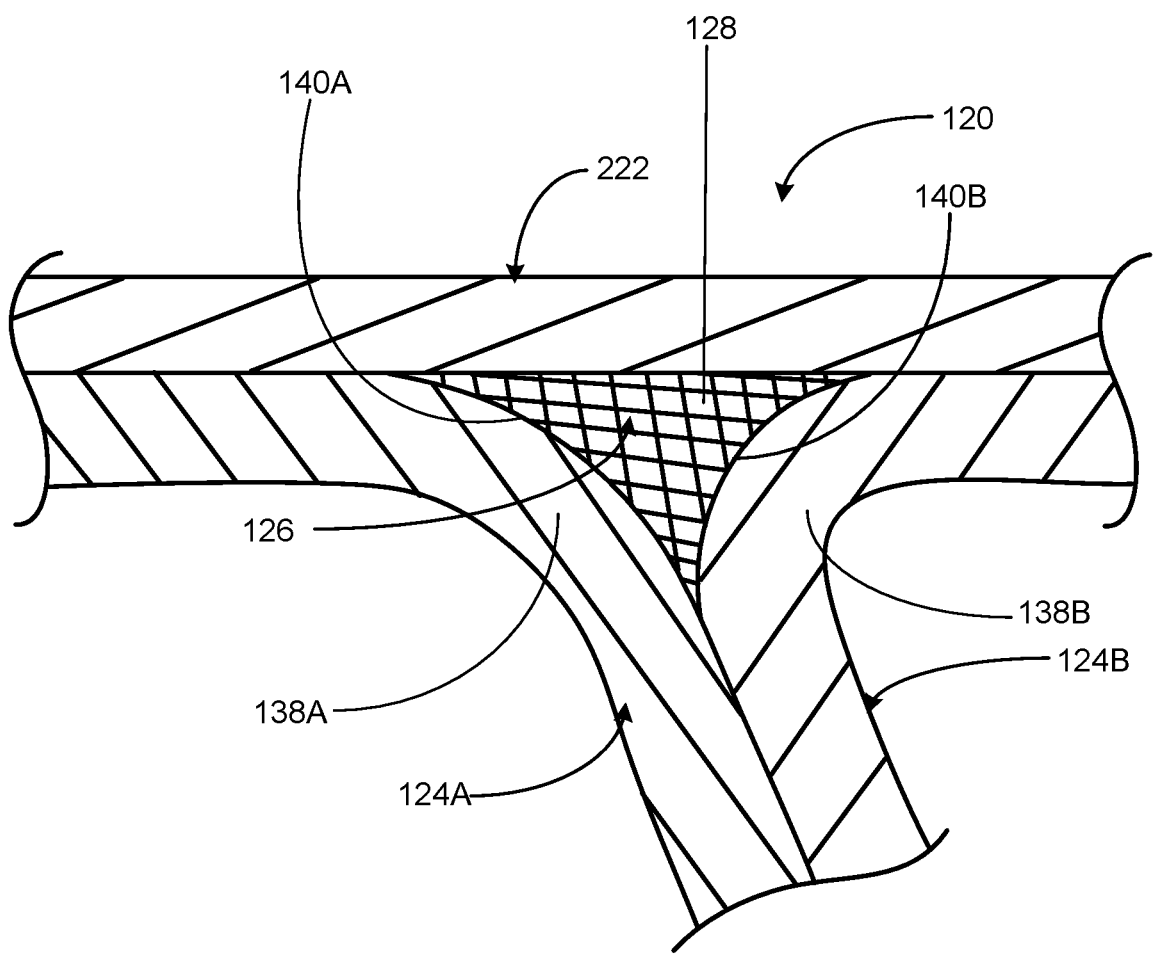
FIG. 3 is a cross-sectional side view of a joint of complex structure made from composite materials according to one embodiment.

According to some embodiments, the cross-sectional shape of the gap defined by the joint, and the cross-sectional shape of the thermoplastic filler, can be non-symmetrical. For example, as shown in FIG. 3, the smaller radius of curvature of the bent portion 138B of the thermoset layer 124B results in the curved surface 140B of the thermoplastic filler 126 having a smaller radius of curvature than the curved surface 140A. Because the radii of curvature of the curved surfaces 140A, 140B of the thermoplastic filler 126 are different, the cross-sectional shape of the filler 126 is non-symmetrical. Additionally, in some embodiments, the flat portion 23 can be replaced with a bent portion similar to bent portions 38A, 38B. Accordingly, the surface 42 (e.g., flat side) of the thermoplastic filler 26 can be curved in a manner similar to curved sides 40A, 40B of the filler to match the curvature of the bent portion replacing the flat portion 23 in such embodiments.

Figure 4:
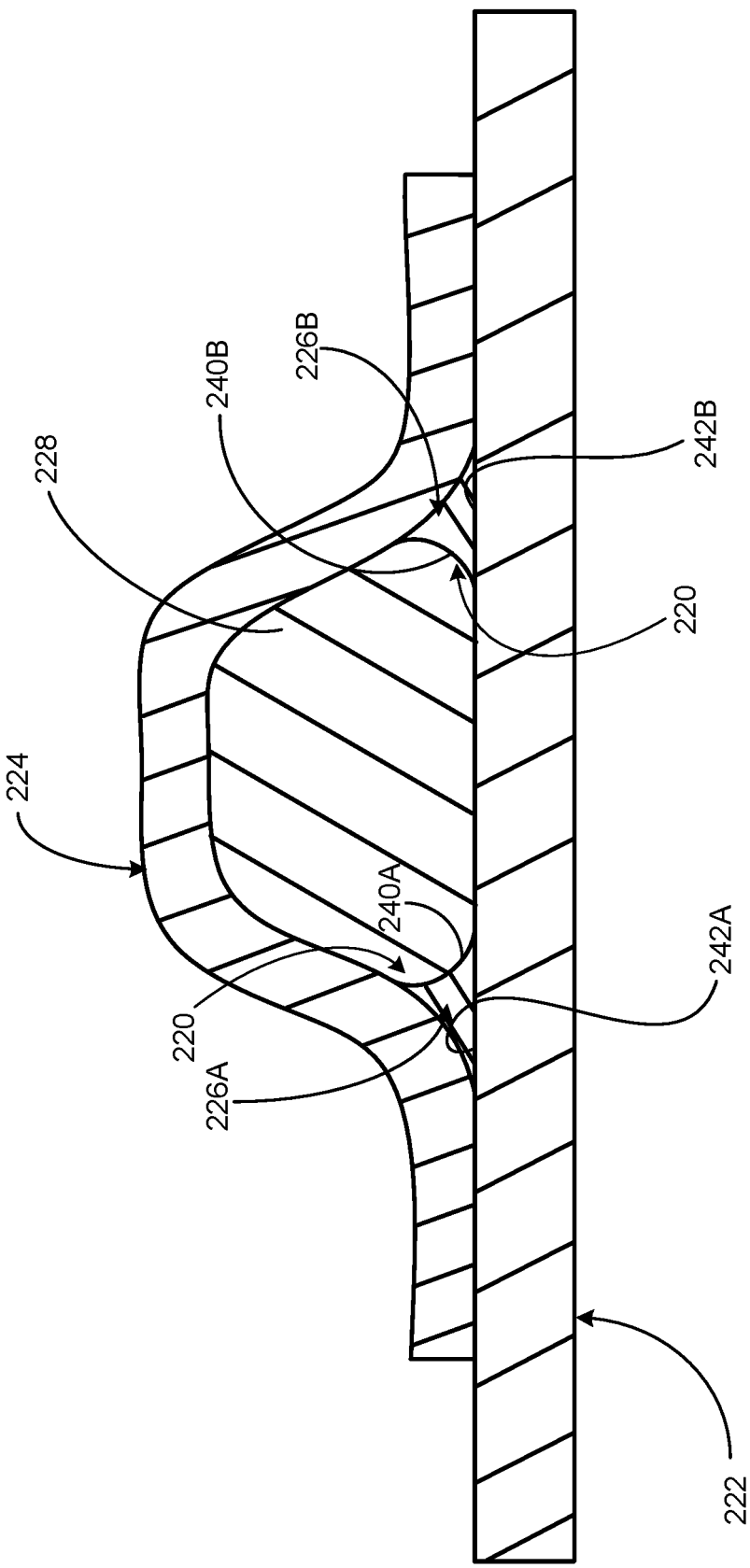
FIG. 4 is a cross-sectional side view of a joint of complex structure made from composite materials according to another embodiment.
Figure 5:
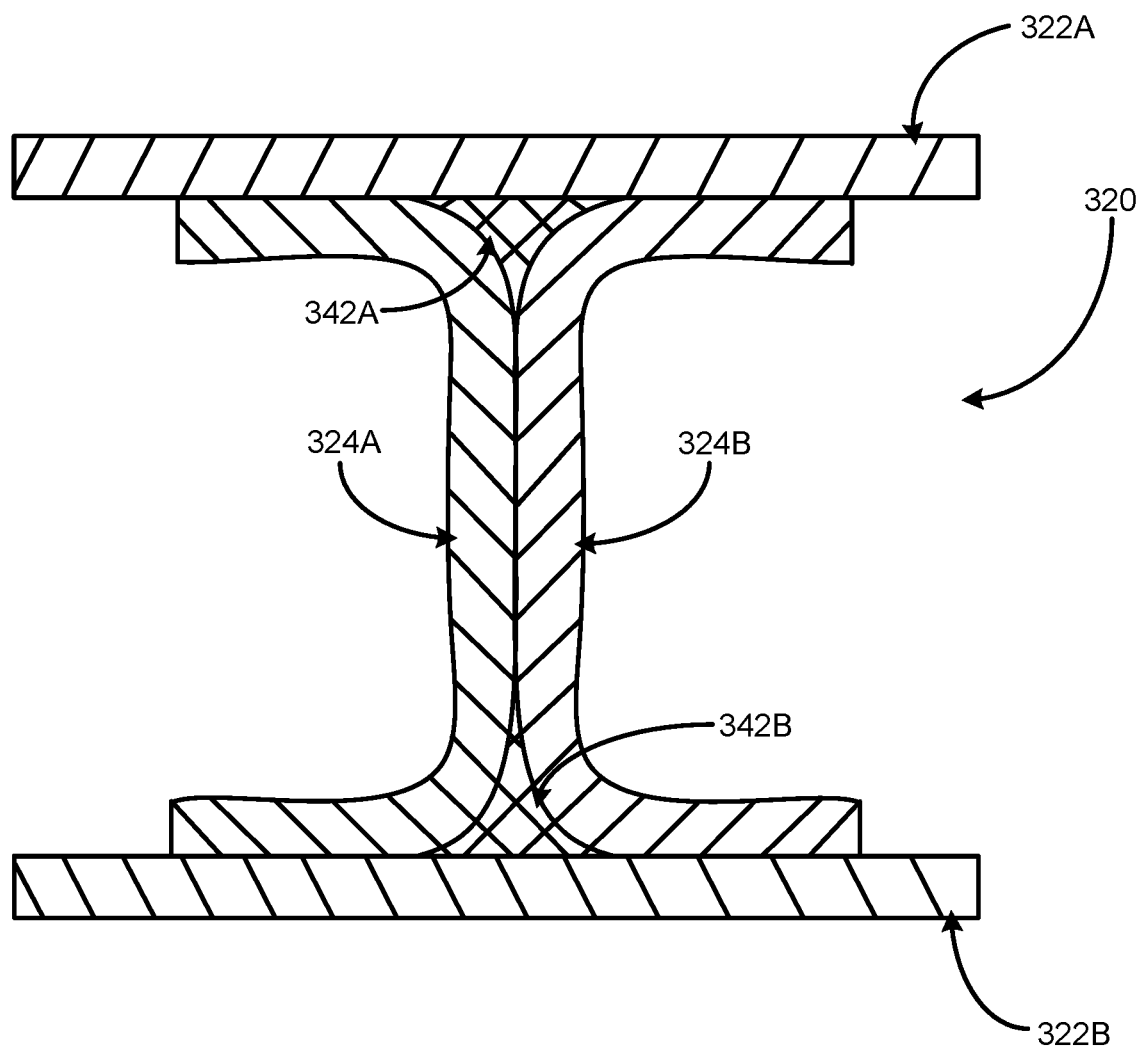
FIG. 5 is a cross-sectional side view of a joint of complex structure made from composite materials according to yet another embodiment.

Further, although the joints shown in the embodiments of FIGS. 1-3 are formed from three thermoset layers, in other embodiments, the joint can be formed from two or more than three thermoset layers. For example, as shown in a hat stiffener or stringer configuration of FIG. 4, each of two joints 220 is formed from two thermoset layers 222, 224. Each joint 220 includes a respective thermoplastic filler 226A, 226B located within a space between the thermoset layers 222, 224. Each thermoplastic filler 226A, 226B includes surfaces that engage the thermoset layers 222, 224, and a respective surface 240A, 240B that engages a core thermoset layer 228 positioned between the thermoset layers 222, 224. In some implementations, the core thermoset layer positioned between the thermoset layers can be solid as shown in FIG. 4, or in other implementations, the core thermoset layer can be a relatively thin layer or layers of thermoset material with a hollow core (e.g., a plurality of inner-wrapped plied). In yet certain implementations, no core thermoset layer 228 is used and the surfaces 240A, 240B do not engage (e.g., support) thermoset layers. Additionally, like the thermoset layer 224 of FIG. 4, a single thermoset layer can form multiple joints. For example, as shown in an I-stiffener configuration of FIG. 5, each of the two bent portions of the dual thermoset layers 324A, 324B at least partially defines one of two gaps in which a respective thermoplastic filler 342A, 342B is located. The gaps are further defined by two flat portions of respective thermoset layers 322A, 322B.

Although the joints shown in the embodiments of FIGS. 1-3 include a thermoplastic filler with a generally triangular cross-sectional shape, in other embodiments, the thermoplastic filler can have a cross-sectional shape other than triangular. For example, some joints may be formed by more than three thermoset layers such that the joint gap and associated thermoplastic filler has polygonal cross-sectional shape with four or more sides.

Figure 6:
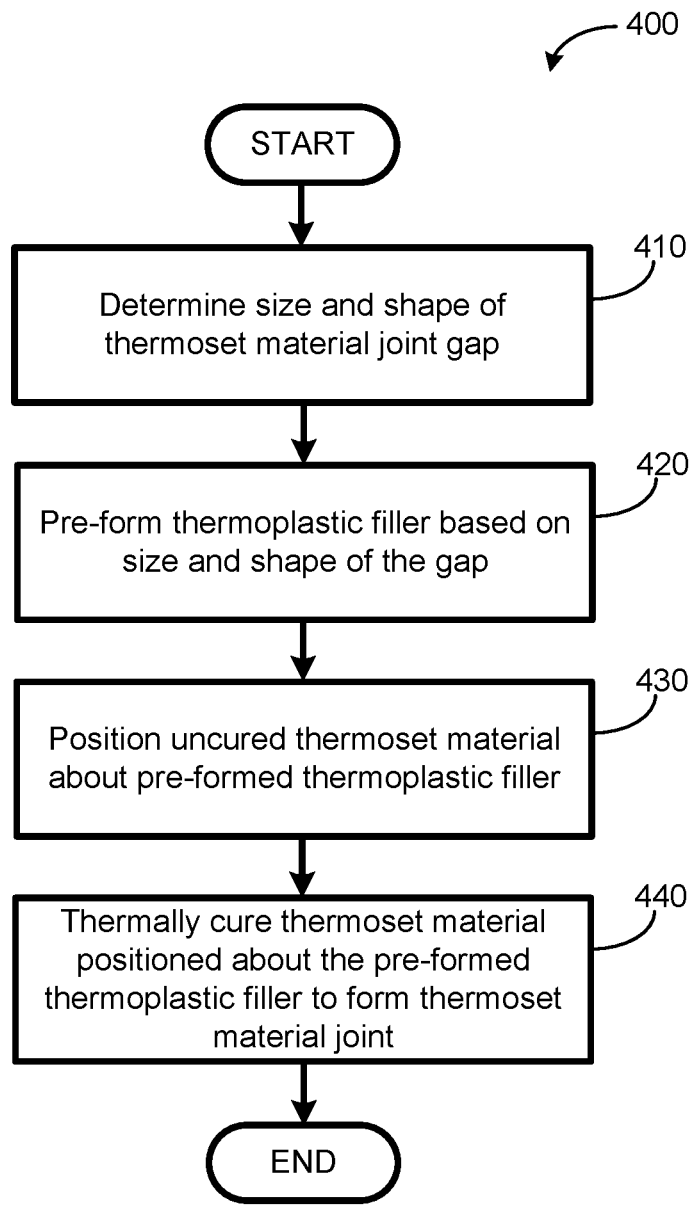
FIG. 6 is a schematic flow diagram of a method for making a joint in a complex structure made from composite materials according to one embodiment.

Referring to FIG. 6, and according to one embodiment, a method 400 for making a joint in a structure includes determining the size and shape of a gap defined by a joint made from a thermoset material at 410. The step 410 is performed before the joint in formed, and can be performed during the design phase of the structure. In some implementations, based on the desired design of a structure, and more specifically, the desired configuration of adjoining thermoset layers of a joint, the resultant size and shape of the gap defined between the layers can be predicted or estimated. The prediction or estimation of the size and shape of the gap may take into account a predicted shrinkage of the thermoset material during curing. In some implementations, the thermoset material is designed to be bent or radiused at the joint such that the desired shape of the gap has radiused sides. Accordingly, determining the size and shape of the thermoset material joint gap at 410 can include determining the desired radius of curvature of the sides of the joint gap after curing.

After the size and shape of the joint gap is determined at 410, the method 400 includes pre-forming a thermoplastic filler based on the size and shape of the thermoset material joint gap at 420. Pre-forming the thermoplastic filler means forming or making the thermoplastic filler before the joint is formed. In some implementations, the thermoplastic filler is pre-formed at 420 to have substantially the same size and shape as the size and shape of the joint gap determined at 410. Therefore, the thermoplastic filler can be pre-formed at 420 to have one or more concave surfaces corresponding to bent portions of the thermoset material. Pre-forming the thermoplastic filler at 420 can include melting and/or pressurizing a thermoplastic material into a pliable state, and molding the pliable thermoplastic material into a desirable size and shape using a mold or die. The molded thermoplastic material is then allowed to cool, which hardens the material into the desirable size and shape. In other implementations, pre-forming the thermoplastic filler at 420 includes machining a hard piece or billet of thermoplastic material into the desirable size and shape. Further, pre-forming the thermoplastic filler at 420 may include forming (e.g., cutting) a thermoplastic material having a desired cross-sectional shape into a desired length.

After the thermoplastic filler is formed at 420, the method 400 includes positioning uncured thermoset material about the pre-formed thermoplastic filler at 430. In certain implementations, step 430 of the method 400 includes positioning or arranging the uncured thermoset material into the desired configuration adjoining each other about the pre-formed thermoplastic filler to form the joint. Step 430 can include positioning two, three, or more layers of uncured thermoset material about the pre-formed thermoplastic filler. In some implementations, positioning the uncured thermoset material about the pre-formed thermoplastic filler can include applying the uncured thermoset material onto the pre-formed thermoplastic filler such that the filler supports the uncured thermoset material in place. The thermoset material can be a composite material (e.g., fibrous material) with a thermoset matrix. Further, the uncured thermoset material can be a pre-impregnated and uncured sheet of composite material.

With the uncured thermoset material positioned about the pre-formed thermoplastic filler, the method 400 includes thermally curing the thermoset material at 440, which concurrently bonds together the thermoset material and thermoplastic filler to form a joint. Due to the chemical properties of the thermoset material, curing the thermoset material at 440 permanently sets or hardens the thermoset material about the pre-formed thermoplastic filler. Thermally curing the thermoset material at 440 includes applying heat at or above a desired curing temperature to the thermoset material. The desired curing temperature is below the melting temperature of the thermoplastic material forming the filler. Therefore, thermally curing the thermoset material at 440 does not melt or destabilize the pre-formed thermoplastic filler.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making a joint for a structure, comprising:
   forming a thermoplastic filler, having a length and made from a thermoplastic material;
   applying an uncured first thermoset layer into direct contact with the thermoplastic filler along the length of the thermoplastic filler, the uncured first thermoset layer comprising a first fibrous material embedded in a first thermoset matrix;
   applying an uncured second thermoset layer into direct contact with the thermoplastic filler along the length of the thermoplastic filler and into contact with the uncured first thermoset layer, the uncured second thermoset layer comprising a second fibrous material embedded in a second thermoset matrix;

applying an uncured third thermoset layer into direct contact with the thermoplastic filler along the length of the thermoplastic filler and into contact with the uncured first and second thermoset layers, the uncured third thermoset layer comprising a third fibrous material, embedded in a third thermoset matrix; and while the uncured first, second, and third thermoset layers are applied into direct contact with the thermoplastic filler and while the uncured second thermoset layer contacts the uncured first thermoset layer and the uncured third thermoset layer, curing the uncured first thermoset layer, the uncured second thermoset layer, and the uncured third thermoset layer at a temperature below a melting temperature of the thermoplastic material to form a cured first thermoset layer, a cured second thermoset layer, and a cured third thermoset layer and bond together the cured first thermoset layer, the cured second thermoset layer, the cured third thermoset layer, and the thermoplastic filler.

2. The method of claim 1, wherein forming the thermoplastic filler comprises compression molding the thermoplastic material.

3. The method of claim 1, wherein forming the thermoplastic filler comprises extruding the thermoplastic material.

4. The method of claim 1, wherein forming the thermoplastic filler comprises forming at least one concave surface in the thermoplastic filler, and wherein applying the uncured first thermoset layer onto the thermoplastic filler comprises bending the uncured first thermoset layer along the at least one concave surface, and curing the uncured first thermoset layer comprises curing the uncured first thermoset layer while bent along the at least one concave surface.

5. The method of claim 1, wherein forming the thermoplastic filler comprises embedding unidirectional reinforcement fibers into the thermoplastic material.

6. The method of claim 1, wherein forming the thermoplastic filler comprises forming the thermoplastic filler with an asymmetrical geometry.

7. A method for making a joint for a structure, comprising:
forming a thermoplastic filler, having a length and made from a thermoplastic material;
applying an uncured first thermoset layer into direct contact with the thermoplastic filler along the length of the thermoplastic filler, the uncured first thermoset layer comprising a first fibrous material embedded in a first thermoset matrix;
applying an uncured second thermoset layer into direct contact with the thermoplastic filler along the length of the thermoplastic filler and into contact with the uncured first thermoset layer, the uncured second thermoset layer comprising a second fibrous material embedded in a second thermoset matrix;
applying an uncured third thermoset layer into direct contact with the thermoplastic filler along the length of the thermoplastic filler and into contact with the uncured first and second thermoset layers, the uncured third thermoset layer comprising a third fibrous material, embedded in a third thermoset matrix; and
while the uncured first, second, and third thermoset layers are applied into direct contact with the thermoplastic filler and while the uncured second thermoset layer contacts the uncured first thermoset layer and the uncured third thermoset layer, curing the uncured first thermoset layer, the uncured second thermoset layer, and the uncured third thermoset layer to form a cured first thermoset layer, a cured second thermoset layer, and a cured third thermoset layer and bond together the cured first thermoset layer, the cured second thermoset layer, the cured third thermoset layer, and the thermoplastic filler without melting the thermoplastic filler.

8. The method of claim 7, wherein forming the thermoplastic filler comprises compression molding the thermoplastic material.

9. The method of claim 7, wherein forming the thermoplastic filler comprises extruding the thermoplastic material.

10. The method of claim 7, wherein forming the thermoplastic filler comprises forming the thermoplastic filler with an asymmetrical geometry.

11. The method of claim 7, wherein forming the thermoplastic filler comprises forming a flat surface on the thermoplastic filler.

12. The method of claim 7, wherein forming the thermoplastic filler comprises embedding reinforcement fibers into the thermoplastic material.

13. The method of claim 7, wherein forming the thermoplastic filler comprises forming the thermoplastic filler to be approximately equal in length to at least one of:
the uncured first thermoset layer along a region of the uncured first thermoset layer to be bonded to the thermoplastic filler or
the uncured second thermoset layer along a region of the uncured second thermoset layer to be bonded to the thermoplastic filler.

14. The method of claim 7, wherein forming the thermoplastic filler comprises forming the thermoplastic filler to be different in length from at least one of:
the uncured first thermoset layer along a region of the uncured first thermoset layer to be bonded to the thermoplastic filler or
the uncured second thermoset layer along a region of the uncured second thermoset layer to be bonded to the thermoplastic filler.

15. The method of claim 7, wherein forming the thermoplastic filler comprises forming at least one concave surface in the thermoplastic filler, and wherein applying the uncured first thermoset layer onto the thermoplastic filler comprises bending the uncured first thermoset layer along the at least one concave surface and curing the uncured first thermoset layer comprises curing the uncured first thermoset layer while bent along the at least one concave surface.

16. The method of claim 7, wherein a melting temperature of the thermoplastic material of the thermoplastic filler is between about 450° F. and about 650° F.

17. A method for forming a joint, the method comprising steps of:
forming a thermoplastic filler, having a length and comprising a thermoplastic material and unidirectional reinforcement fibers;
applying an uncured first thermoset layer into direct contact with the thermoplastic filler along the length of the thermoplastic filler, wherein the uncured first thermoset layer comprises a first fibrous material, embedded in a first thermoset matrix;
applying an uncured second thermoset layer into direct contact with the thermoplastic filler along the length of the thermoplastic filler, wherein the uncured second thermoset layer comprises a second fibrous material, embedded in a second thermoset matrix;
applying an uncured third thermoset layer into direct contact with the thermoplastic filler along the length of the thermoplastic filler, wherein:
the uncured third thermoset layer comprises a third fibrous material, embedded in a third thermoset matrix, the uncured second thermoset layer is coupled to the uncured first thermoset layer and the uncured third thermoset layer to form the joint, and a gap is defined between the uncured first thermoset layer, the uncured second thermoset layer, and the uncured third thermoset layer;

positioning the thermoplastic filler within the gap, wherein:

the thermoplastic material of the thermoplastic filler has a melting temperature that is greater than a cure temperature of each of the first thermoset matrix and the second thermoset matrix, the melting temperature of the thermoplastic material of the thermoplastic filler is between about 450° F. and about 750° F., and the thermoplastic filler supports and maintains a first shape of a portion of the uncured first thermoset layer and a second shape of a portion of the uncured second thermoset layer; and while the uncured first thermoset layer, the uncured second thermoset layer, and the uncured third thermoset layer are applied into direct contact with the thermoplastic filler, curing the uncured first thermoset layer, the uncured second thermoset layer, and the uncured third thermoset layer without melting the thermoplastic material of the thermoplastic filler.

18. The method of claim 17, wherein the step of forming the thermoplastic filler comprises forming at least one concave surface in the thermoplastic filler; and the first shape of the portion of the uncured first thermoset layer is a concave shape.

19. The method of claim 17, wherein forming the thermoplastic filler comprises forming the thermoplastic filler with an asymmetrical geometry.

20. The method of claim 17, wherein applying the uncured first thermoset layer comprises shaping the portion of the uncured first thermoset layer, using the thermoplastic filler, into the first shape that is complementary to a shape of a first portion of the thermoplastic filler by applying the portion of the uncured first thermoset layer into direct contact with the first portion of the thermoplastic filler and wherein applying the uncured second thermoset layer comprises shaping the portion of the uncured second thermoset layer, using the thermoplastic filler, into the second shape that is complementary to a shape of a second portion of the thermoplastic filler by applying the portion of the uncured second thermoset layer into direct contact with the second portion of the thermoplastic filler.

\* \* \* \* \*